(12) United States Patent
Radtchenko

(10) Patent No.: US 8,232,889 B2
(45) Date of Patent: Jul. 31, 2012

(54) COMMUNICATION SYSTEM IN A MOTOR VEHICLE, AND METHOD FOR SETTING UP A WIRELESS AD-HOC RADIO NETWORK

(75) Inventor: Andrei Radtchenko, Pessin (DE)

(73) Assignee: Continental Automotive GmbH, Hannover (DE)

( * ) Notice: Subject to any disclaimer, the term of this patent is extended or adjusted under 35 U.S.C. 154(b) by 1030 days.

(21) Appl. No.: 12/086,461

(22) PCT Filed: Nov. 13, 2006

(86) PCT No.: PCT/EP2006/068385
§ 371 (c)(1),
(2), (4) Date: Jun. 12, 2008

(87) PCT Pub. No.: WO2007/068542
PCT Pub. Date: Jun. 21, 2007

(65) Prior Publication Data
US 2010/0255866 A1   Oct. 7, 2010

(30) Foreign Application Priority Data
Dec. 13, 2005 (DE) .................. 10 2005 059 522

(51) Int. Cl.
*G08B 21/00* (2006.01)
(52) U.S. Cl. .............. 340/686.1; 340/902; 340/903; 455/345; 701/96
(58) Field of Classification Search .............. 455/500, 455/41.2, 569.1, 569.2, 456.1–457, 9, 345; 340/901–905, 441, 447, 686.1; 701/96, 1, 701/207
See application file for complete search history.

(56) References Cited

U.S. PATENT DOCUMENTS

| | | | |
|---|---|---|---|
| 5,131,154 A * | 7/1992 | Schierbeek et al. ............ 33/356 |
| 6,587,689 B1 | 7/2003 | Panasik |
| 7,010,667 B2 * | 3/2006 | Vorbach et al. ................. 712/10 |
| 7,110,880 B2 | 9/2006 | Breed et al. |
| 7,289,800 B2 | 10/2007 | Rekimoto |
| 7,326,170 B1 * | 2/2008 | Miller ............................... 600/9 |
| 2002/0150050 A1 | 10/2002 | Nathanson |
| 2004/0215373 A1 * | 10/2004 | Won et al. ......................... 701/1 |
| 2004/0230374 A1 * | 11/2004 | Tzamaloukas ................ 701/217 |
| 2005/0222716 A1 * | 10/2005 | Tengler et al. .................... 701/1 |
| 2006/0224295 A1 * | 10/2006 | Tengler et al. .................. 701/96 |
| 2011/0028099 A1 * | 2/2011 | Cohen et al. ................. 455/63.4 |

FOREIGN PATENT DOCUMENTS

| | | |
|---|---|---|
| EP | 1 077 579 | 2/2001 |
| EP | 1 223 567 | 7/2002 |
| EP | 1 471 481 A2 | 10/2004 |
| JP | 2004-310425 | 11/2004 |
| JP | 2004-326791 | 11/2004 |
| JP | 2005-223722 | 8/2005 |
| JP | 2005-269042 | 9/2005 |
| JP | 2005-323901 | 11/2005 |

\* cited by examiner

*Primary Examiner* — Dominic E Rego
(74) *Attorney, Agent, or Firm* — Cozen O'Connor

(57) ABSTRACT

Presented is a communication system in a motor vehicle which is designed to participate in a chain-like ad-hoc radio network comprising a number of traveling motor vehicles. The system includes a control unit, a transmission/reception unit in communication with the control unit, and an orientation unit configured to determine an orientation of the motor vehicle relative to a reference direction, the orientation unit being in communication with the control unit. The control unit is configured to determine the orientation of the motor vehicle with respect to an orientation of at least one other motor vehicle which is received by the transmission/reception unit.

12 Claims, 1 Drawing Sheet

COMMUNICATION SYSTEM IN A MOTOR VEHICLE, AND METHOD FOR SETTING UP A WIRELESS AD-HOC RADIO NETWORK

CROSS-REFERENCE TO RELATED APPLICATION

This is a U.S. national stage of International Application No. PCT/EP2006/068385, filed on 13 Nov. 2006. Priority is claimed on German Application No. 10 2005 059 522.7, filed on 13 Dec. 2005.

BACKGROUND OF THE INVENTION

1. Field of the Invention

The invention relates to a communication system in a motor vehicle which is designed to participate in a chain-like ad-hoc radio network between motor vehicles and has a control unit and a transmission/reception unit connected to the control unit. The invention also relates to a method for setting up a wireless chain-like ad-hoc radio network between motor vehicles.

2. Description of the Related Art

Ad-hoc radio networks including a number of motor vehicles are also known by the term "car-to-car communication". Within such a radio network, the motor vehicles can exchange information with one another. This can be, for example, information about hazard locations, the conditions of the roadway or also the approach of a motor vehicle having priority, or the like.

Each of the participating motor vehicles has a transmission/reception unit having a low transmitting power. The transmitting power is dimensioned, for example, in such a manner that only a connection to adjacent motor vehicles can be initiated. Overall, however, a radio chain between the individual motor vehicles involved is set up in this arrangement so that information can also be communicated to a motor vehicle from a motor vehicle further distant outside its own radio range. Such a communication system is disclosed in EP 1 223 567 A1.

If an inquiry is sent out from a motor vehicle to other motor vehicles via such an ad-hoc radio network, there is only an interest, as a rule, in responses from such motor vehicles which travel the road in the same direction of travel. Motor vehicles which travel in the opposite direction of travel encounter, for example, other traffic conditions, particularly in the case of roads having separate roadways for the two directions of travel. If the motor vehicles have a navigation system, the direction of travel can also be inferred by means of the data determined by the navigation system and this information can be transmitted together with the inquiry. Other motor vehicles which also have such a navigation system in which their own position is determined, for example by means of known methods such as satellite position finding and "map matching" including map data, can now determine whether they are underway in the same direction of travel of the road as the inquiring motor vehicle and decide correspondingly whether a response is transmitted or not. Although navigation systems are relatively widely used in the meantime, the greatest proportion of motor vehicles in existence does not yet have such a system and it cannot be expected in the future, either, that all motor vehicles will have navigation systems.

SUMMARY OF THE INVENTION

It is the object of the invention, therefore, to specify a communication system of a motor vehicle which is designed for participating in a chain-like ad-hoc radio network between motor vehicles and is capable, even without resorting to position data of a navigation system, of assessing whether the motor vehicle equipped with the communication system is moving in the same direction of travel on a road as an inquiring motor vehicle. A further object of the invention consists in specifying a method for setting up a wireless chain-like ad-hoc radio network between motor vehicles which also manages without information from a navigation system and, nevertheless, allows a direction-related inclusion of motor vehicles in the ad-hoc radio network.

The communication system of a motor vehicle which is designed for participating in a chain-like ad-hoc radio network between motor vehicles has a control unit and a transmission/reception unit connected to the control unit. The communication system also has means connected to the control unit, for determining an orientation of the motor vehicle with respect to a reference direction. This makes it possible to determine the motor vehicle's own direction of travel. Furthermore, the control unit is designed for evaluating the orientation of the motor vehicle with respect to orientation, received via the transmission/reception unit, of at least one further motor vehicle. Thus, the navigation system compares its own orientation with the orientation of a further motor vehicle and evaluates the relative orientation of the motor vehicles with respect to one another. Using this evaluation, it is then possible to decide whether the motor vehicle is traveling on a road in the same direction of travel as the enquiring motor vehicle. The selected orientation of the motor vehicle will be, as a rule, a longitudinal direction.

If the means for determining an orientation of the motor vehicle have an electronic compass, the orientation of the motor vehicle can be determined in a particularly simple and cost-effective manner. If then a compass point, particularly North is selected as reference direction, the output signal of the electronic compass can be taken directly as a measure of the orientation of the motor vehicle.

The communication system according to the invention thus provides the possibility of forming an information chain in a simple manner. Since only one additional device is present for determining the orientation of the motor vehicle, short implementation times are obtained. In particular, it is no longer necessary to have an elaborate navigation system so that the communication system overall can be implemented cost-effectively.

In a method for setting up a wireless chain-like ad-hoc radio network between motor vehicles, an orientation of the first motor vehicle with respect to a reference direction is determined in a first motor vehicle initializing the setting-up of the ad-hoc network. The orientation of the first motor vehicle is transmitted wirelessly to at least one second motor vehicle. In the second motor vehicle, an orientation of the second motor vehicle with respect to the reference direction is determined and a relative orientation of the second motor vehicle with respect to the first motor vehicle is determined. Finally, an evaluation of the relative orientation of the first motor vehicle to the second one is carried out in the second motor vehicle and on the basis of a result of the evaluation, a decision is made whether the second motor vehicle becomes a participant in the ad-hoc radio network. During the evaluation, the determined relative orientation of the first motor vehicle to the second one can be compared with a predetermined maximum value, in particular. If the relative orientation determined is less than this predetermined maximum value, it can be assumed that the second motor vehicle is traveling on the road in the same direction as the first motor vehicle and the second motor vehicle then becomes participant in the ad-hoc radio network and can send a response to the first motor vehicle.

The second motor vehicle then additionally forwards the inquiry and in doing so communicates the orientation of the inquiring motor vehicle. Motor vehicles which receive the inquiry forwarded by the second motor vehicle can then also decide on the basis of a comparison of their own orientation with the orientation of the first motor vehicle whether they are traveling on the road in the same direction of travel, become participants in the network and forward the inquiry.

As a rule, this method is adequate if the road curvature is relatively slight. In the case of very curvy roads such as, in particular, mountain roads with serpentines, the relative orientation between the inquiring motor vehicle and a motor vehicle traveling farther ahead can be great due to a curve and exceed the predetermined maximum value. In this case, the chain already breaks off early since, due to the very great difference in the determined orientation of the motor vehicles, it is not assumed that the motor vehicles are traveling a road in the same direction of travel.

In a development of the method, it is proposed, therefore, that the second motor vehicle wirelessly communicates the orientation of the first motor vehicle and of the second motor vehicle to at least one third motor vehicle, a relative orientation of the third motor vehicle with respect to the first motor vehicle and the second one is determined in the third motor vehicle, an evaluation of the relative orientation of the first motor vehicle with respect to the third motor vehicle and of the second motor vehicle with respect to the third one is carried out in the third motor vehicle and, on the basis of a result of the evaluation, a decision is made whether the third motor vehicle becomes participant in the ad-hoc radio network. The second motor vehicle thus communicates to the third motor vehicle, apart from the orientation of the inquiring first motor vehicle, also its own orientation. In the third motor vehicle, the relative orientation of the first motor vehicle to the third one and the relative orientation of the second motor vehicle to the third one is then evaluated and on the basis of the result of the evaluation, a decision is made whether the third motor vehicle becomes participant in the ad-hoc radio network. This procedure has the advantage that both the orientation of a neighboring motor vehicle and the orientation of the motor vehicle initializing the ad-hoc radio network, which has sent out an inquiry, is included in the evaluation.

In particular, the orientation of the first motor vehicle and the orientation of the third motor vehicle can then be communicated wirelessly to at least one fourth motor vehicle by the third motor vehicle. In the fourth motor vehicle, a relative orientation of the fourth motor vehicle with respect to the first motor vehicle and the third one can then be determined and an evaluation of the relative orientation of the first motor vehicle to the fourth one and of the third motor vehicle to the fourth one carried out. On the basis of a result of the evaluation, a decision is then made whether the fourth motor vehicle becomes participant in the ad-hoc radio network. Generally, therefore, a development of the chain, both the orientation of the nth motor vehicle and the orientation of the first motor vehicle are forwarded to the (n+1)th motor vehicle and the (n+1)th motor vehicle evaluates its relative orientation with respect to the nth motor vehicle and the first motor vehicle.

When setting up such a chain-like ad-hoc radio network, the orientation of the motor vehicles can be determined in a different manner in each case of the individual motor vehicles, also including, in particular, those motor vehicles in which the orientation is determined by means of an electronic compass. The reference direction is then preferably a compass point, particularly North.

BRIEF DESCRIPTION OF THE DRAWINGS

In the text which follows, the invention will be described in greater detail with reference to an exemplary embodiment and the drawings.

DETAILED DESCRIPTION OF THE PREFERRED EMBODIMENTS

Figure 1:
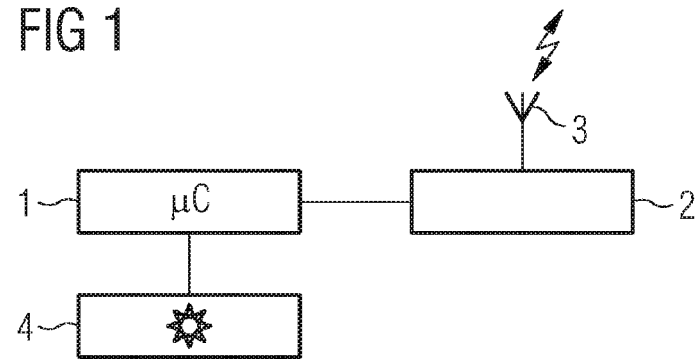
FIG. 1 is an illustrative block diagram of the components of a communication system, according to one embodiment of the invention.

FIG. 1 shows an embodiment according to the invention of a communication system which is designed for participating in a chain-like ad-hoc radio network between motor vehicles. The communication system has a control unit 1. The control unit 1 is connected to a transmission/reception unit 2 which receives and sends out radio signals via an antenna 3. The control unit 1 is also connected to an orientation unit 4, such as an electronic compass, which conducts information with regard to the orientation of the motor vehicle with respect to North to the control unit 1. The orientation is here related to a longitudinal direction of the motor vehicle which extends from the rear end to the front end of the motor vehicle and may also be presented as a vector. The control unit 1 is designed for evaluating the orientation of the motor vehicle with respect to an orientation, received via the transmission/reception unit 2, of at least one further motor vehicle. The evaluation is carried out in the control unit 1 using a corresponding computer program.

Figure 2:
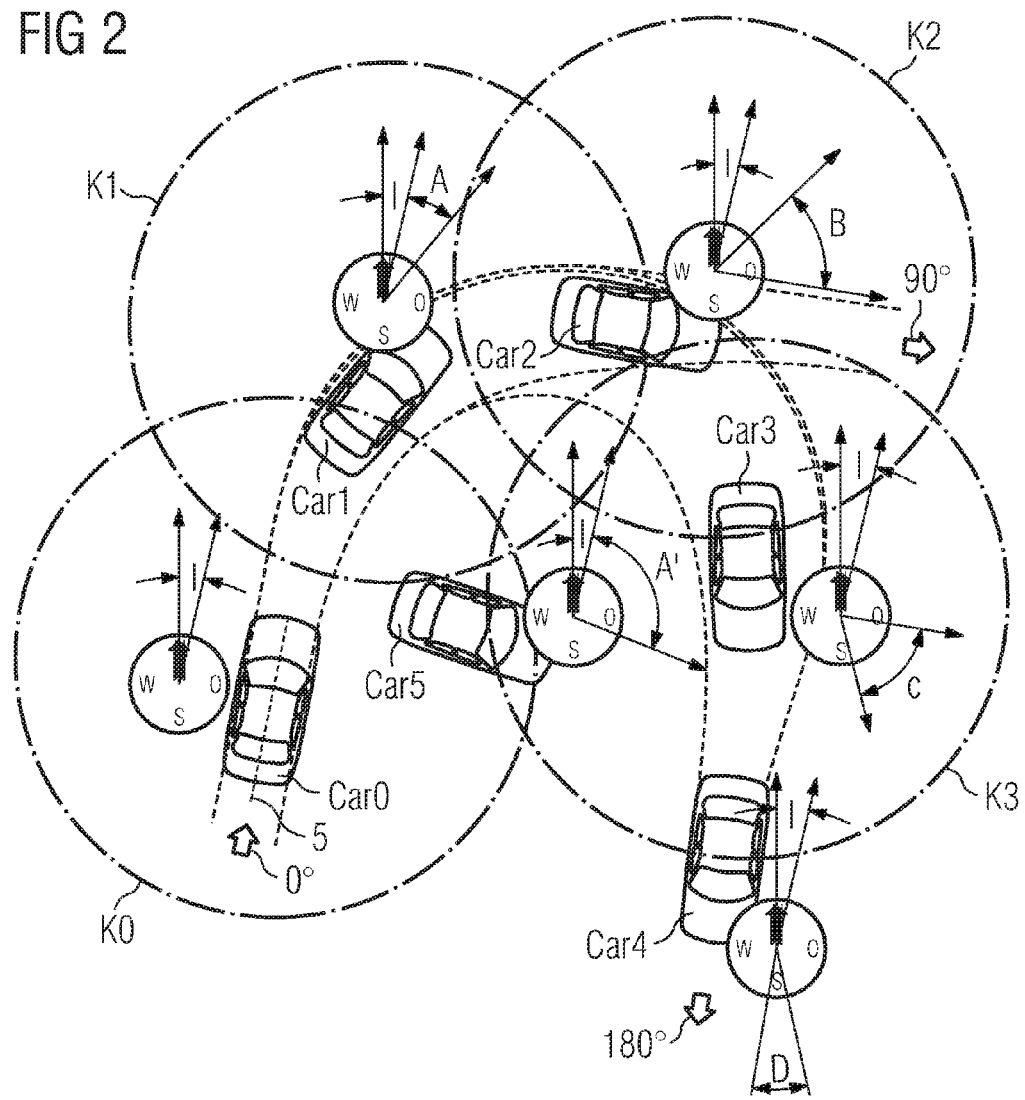
FIG. 2 is an illustrative diagram of a road situation including a plurality of motor vehicles, according to one embodiment of the invention.

FIG. 2 shows a road situation with a number of motor vehicles car0 to car5 by means of which the structure of the ad-hoc network will be explained. All motor vehicles have a communication system for communication from motor vehicle to motor vehicle. The range of the communication systems of the individual motor vehicles is limited and is illustrated by the circles K0 to K4, wherein circle K0 specifies the limit of the range of the communication system of motor vehicle car0, circle K1 specifies the limit of the range of the communication system of motor vehicle car1 etc.

The motor vehicle car0 sends out via its communication system an inquiry such as, e.g. "what is the traffic situation (speed, weather conditions, gas station and similar) in my direction of travel". In addition, motor vehicle car0 sends along its own orientation which has been determined by means of the electronic compass 4. The orientation of the motor vehicle is here the orientation of the longitudinal axis 5 of the motor vehicle with reference to the preferred direction North (N). In the example, the angle I between the North direction and the longitudinal axis 5 is 20°.

The communication systems of motor vehicles car1 and car5 receive the inquiry of motor vehicle car0. Motor vehicles car1 and car5 thereupon determine their own orientation and compare these with the orientation of motor vehicle car0 which was communicated together with the inquiry.

During the evaluation of the relative orientation of motor vehicle car5 with respect to motor vehicle car0, which was also communicated by motor vehicle car0, the communication system of motor vehicle car5 finds that, on the basis of the predetermined evaluation criteria, it is not traveling on the road in the same direction of travel as motor vehicle car0. Motor vehicle car5 therefore does not couple itself into the network and does not forward the inquiry.

During the evaluation of the relative orientation of motor vehicle car1 with respect to motor vehicle car0, the communication system of motor vehicle car1 finds, on the basis of the predetermined evaluation criteria that, motor vehicle car1 is traveling on the road in the same direction of travel as motor vehicle car0. Motor vehicle car1 therefore becomes participant in the ad-hoc network and forwards the inquiry of motor vehicle car0 via its communication system. In this process, the communication system of motor vehicle car1 transmits both the orientation of motor vehicle car0 and also its own orientation.

The inquiry of motor vehicle car1 is received by motor vehicle car2. The communication system of motor vehicle car2 determines the orientation of motor vehicle car2 and compares it with the received orientations of motor vehicles car0 and car1 and finds, on the basis of the predetermined evaluation criteria, that motor vehicle car2 is also traveling on the road in the same direction of travel as motor vehicles car1 and car0.

Motor vehicle car2 therefore now forwards the inquiry of motor vehicle car0, in which process, apart from the actual inquiry, the orientation of motor vehicle car0 and the orientation of motor vehicle car2 is also communicated in the inquiry.

Motor vehicle car3 receives the inquiry of motor vehicle car2 and determines its own orientation. The communication system of motor vehicle car3 then evaluates the orientation of motor vehicle car3 with respect to the orientation of motor vehicle car0 and the orientation of motor vehicle car3 with respect to the inquiring motor vehicle car2. Using the predetermined evaluation criteria as a basis, the communication system of motor vehicle car3 then also decides whether it becomes participant in the ad-hoc radio network. If the latter is the case, the communication system of motor vehicle car3 also forwards the inquiry as previously described, in which process the orientation of the motor vehicle car3 itself and the orientation of motor vehicle car0 is also communicated. Motor vehicle car0 then receives the inquiry of motor vehicle car3 and also evaluates on the basis of the predetermined criteria whether it becomes participant in the ad-hoc radio network.

In this manner, the inquiry is continued until no further new motor vehicle becomes participant in the ad-hoc radio network. Thus, a chain-like network link is produced wherein the original inquiry of motor vehicle car0 can be answered by all participants in the ad-hoc radio network, an answer of motor vehicle car3 being forwarded, for example, via motor vehicle car2 and motor vehicle car1 to motor vehicle car0.

In the text which follows, the method will be explained with reference to exemplary evaluation criteria and the table. The evaluation includes two truncation criteria. On the one hand, the relative orientation of the motor vehicle receiving the inquiry, for example car3, with respect to the preceding motor vehicle in the chain, that is to say the motor vehicle sending the inquiry, in this case car2, is compared with a first limit value, for example 60°. If, in contrast, a communication system of a motor vehicle finds that the relative orientation of the motor vehicle with respect to the preceding motor vehicle in the chain is more than 60°, this motor vehicle will not enter the chain. A transgression of this first limit value thus represents the first truncation condition.

As a second limit value, the total deviation of the orientation of the current motor vehicle (e.g. car3) which receives the inquiry with respect to the orientation of the motor vehicle initializing the inquiry, in this case car0, can be specified. This second limit value can be, for example, 150°. A transgression of this second limit value could then be a further truncation condition.

A further refinement can be achieved by the chain not being truncated immediately if this second limit value is exceeded once but only, for example, if this second limit value is exceeded by a second motor vehicle or third motor vehicle in the chain. To establish this, a counter can be introduced, the value of which is incremented by 1 with each transgression of the second limit value, the current value of the counter also being communicated with the inquiry. This refinement is advantageous, in particular, with a winding road.

In the embodiment described in the text which follows, such a counter BDHC (BackDirectionHopCount) is introduced, BDHC≧2 being introduced as the second truncation criterion.

In the table, the motor vehicles and packet numbers of the inquiry packets received by these motor vehicles are thus listed in the first column. In the second column, the orientation I of the motor vehicle car0 which initializes the inquiry is noted. In the third column, the orientation AR(n) of each one of the motor vehicles car0 to car5 is specified. These two values I and AR(n) are part of each inquiry packet.

In the fourth column, the relative orientation deltaAR with respect to the respective preceding motor vehicle in the chain, calculated by each motor vehicle car1 to car5 is listed.

In the fifth column, the relative orientation (AR(n)−I) with respect to the first motor vehicle car0, calculated by each motor vehicle car1 to car5 is listed.

In the sixth column, a parameter BD (BackDirection), which can assume the values F (false, untrue), or W (true), is listed for each of the motor vehicles. BD assumes the value W if the associated motor vehicle has a relative orientation with respect to car0 above the second limit value. Otherwise, BD assumes the value F.

In the seventh column, the value of the counter BDHC is specified which is incremented by 1 whenever BD assumes the value W. The current BDHC is communicated together with the inquiry.

TABLE

| Car No. Packet No. | I | AR(n) | deltaAR | AR(n) − I | BD | BDHC |
|---|---|---|---|---|---|---|
| Car0/0 | 20° | 20° | | | | 0 |
| Car1/1 | 20° | 60° | 40° | 40° | F | 0 |
| Car2/2 | 20° | 115° | 55° | 95° | F | 0 |
| Car3/3 | 20° | 173° | 58° | 153° | W | 1 |
| Car4/4 | 20° | 193° | 20° | 173° | W | 2 (Truncation) |
| Car5/1 | 20° | 90° | 70° (Truncation) | 70° | F | 0 |

In the example shown in FIG. 2, the orientation of the motor vehicle car0 with respect to North is 20°. The orientation with respect to North of the motor vehicle car5 receiving the inquiry of motor vehicle car0 is 90°. The relative orientation of motor vehicle car5 with respect to motor vehicle car0 is thus 70° so that the first truncation criterion is met. The motor vehicle car5 does not become participant in the chain due to the first truncation criterion.

Motor vehicle car1 has an orientation of 60° with respect to North. The relative orientation with respect to motor vehicle car0 is 40° and is thus both below the limit value of the first truncation criterion and below the second limit value which is 150°. Parameter BD is thus set to the value F (false) and the counter BDHC remains at 0.

Motor vehicle car2 has an orientation of 115° with respect to North. The relative orientation with respect to the preceding motor vehicle car1 is 55° and is thus below the first limit value. The relative orientation of motor vehicle car2 with respect to car0 is 95° and is thus also below the second limit value so that BD is set equal to F and BDHC remains at 0. Motor vehicle car2 thus also becomes participant in the radio network.

Motor vehicle car3 has an orientation of 173° with respect to North. The relative orientation with respect to motor vehicle car2 is 58° and is thus below the first limit value. The relative orientation of motor vehicle car3 with respect, to motor vehicle car0 is 153°, is thus greater than 150° and is above the second limit value so that BD is now set equal to W (true) and the counter BDHC is incremented from 0 to 1. However, the truncation criterion BDHC≧2 is also not reached by motor vehicle car3 so that this motor vehicle also becomes part of the network.

Motor vehicle car4 has an orientation of 193° with respect to North. The relative orientation with respect to motor vehicle car3 is 20° so that the first truncation criterion is not met. However, the relative orientation of motor vehicle car4 with respect to motor vehicle car0 is 173° and is thus also above the second limit value so that BD is again set equal to W, BDHC is incremented by 1 and thus now reaches the value 2. According to the specifications, a value of BDHC=2 is a truncation condition so that motor vehicle car4 does not become participant in the radio network and also does not forward the inquiry. The chain is thus truncated at this point.

In the method described, each motor vehicle thus sends via its communication system both the orientation I of the motor vehicle car0 initializing the inquiry and its own orientation AR and the counter BDHC together with the inquiry. Each motor vehicle which receives this inquiry compares whether its own relative orientation compared with the preceding inquiring motor vehicle is less than the first limit value. Exceeding the first limit value is a first truncation condition.

Furthermore, a comparison is made whether the relative orientation of this current motor vehicle with respect to the motor vehicle initializing the inquiry is greater than a second limit value and, if this is so, a counter is incremented by 1, reaching a limit value for this counter being a truncation condition, i.e. the corresponding motor vehicle does not forward the inquiry.

The truncation conditions mentioned are quoted only by way of example and can be replaced by other truncation conditions.

What is claimed is:

1. A method for setting up a wireless ad-hoc radio network including a plurality of traveling motor vehicles, the method comprising:
   determining an orientation of a first vehicle with respect to a reference direction and initializing the setting up of the ad-hoc network;
   wirelessly communicating the orientation of the first motor vehicle to a least a second motor vehicle;
   determining in the second motor vehicle an orientation of the second motor vehicle with respect to the reference direction;
   determining in the second motor vehicle a relative orientation of the second motor vehicle with respect to the first motor vehicle;
   evaluating in the second motor vehicle the relative orientation of the first motor vehicle with respect to the second motor vehicle; and
   deciding whether the second motor vehicle becomes a participant in the ad-hoc radio network based on the relative orientation of the first motor vehicle with respect to the second motor vehicle.

2. The method as claimed in claim 1, further comprising:
   wirelessly communicating the orientation of the first motor vehicle and the orientation of the second motor vehicle to at least a third motor vehicle;
   determining in the third vehicle a relative orientation of the third motor vehicle with respect to the first motor vehicle and the second motor vehicle;
   evaluating in the third vehicle the relative orientation of the first motor vehicle with respect to the third motor vehicle and the relative orientation of the second motor vehicle with respect to the third motor vehicle; and
   deciding whether the third motor vehicle becomes a participant in the ad-hoc radio network based on the evaluation.

3. The method as claimed in claim 2 further comprising:
   wirelessly communicating the orientation of the first motor vehicle and the orientation of the third motor vehicle to at least a fourth motor vehicle;
   determining in the fourth vehicle a relative orientation of the fourth motor vehicle with respect to the first motor vehicle and the third motor vehicle;
   evaluating in the fourth the relative orientation of the first motor vehicle with respect to the fourth motor vehicle and the relative orientation of the third motor vehicle with respect to the fourth motor vehicle; and
   deciding whether the fourth motor vehicle becomes a participant in the ad-hoc radio network based on the evaluation.

4. The method as claimed in claim 1, wherein the orientation of at least one of the motor vehicles is determined by an electronic compass.

5. The method as claimed in claim 1, wherein the reference direction comprises a compass point.

6. The method as claimed in claim 5, wherein the reference direction is North.

7. A method of adding an (n+1)th traveling motor vehicle to an ad-hoc radio network including n traveling motor vehicles, the method comprising the step of:
   receiving, by a transmission/reception unit of the (n+1)th motor vehicle, an inquiry from the nth motor vehicle in the ad-hoc radio network;
   determining in the (n+1)th motor vehicle a first relative orientation of the (n+1)th motor vehicle with respect to the reference direction;
   determining in the (n+1)th motor vehicle a second relative orientation of the (n+1)th motor vehicle with respect to the nth motor vehicle;
   determining in the (n+1)th motor vehicle a third relative orientation of the (n+1)th motor vehicle with respect to the first motor vehicle in the chain of motor vehicles in the ad-hoc network;
   determining whether the (n+1)th motor vehicle becomes a participant in the ad-hoc radio network based on the second and third relative orientations.

8. A method for setting up a wireless chain-type ad-hoc radio network between motor vehicles with communication systems for communication from motor vehicle to motor vehicle, comprising:
   determining an orientation of a first motor vehicle with respect to a reference direction initializing the setting-up of the ad-hoc radio network;
   communicating the orientation of the first motor vehicle wirelessly by a respective communication system for the communication from motor vehicle to motor vehicle of the first motor vehicle to a respective communication system for the communication from motor vehicle to motor vehicle of a second motor vehicle;

determining, in the second motor vehicle, an orientation of the second motor vehicle with respect to the reference direction;

determining in the second motor vehicle a relative orientation of the second motor vehicle with respect to the first motor vehicle using the orientation with respect to the reference direction of the first and the second motor vehicle;

evaluating, in the second motor vehicle, the relative orientation of the first motor vehicle with respect to the second motor vehicle is carried out and on the basis of a result of the evaluation, a decision is made whether the second motor vehicle becomes a participant in the ad-hoc radio network by the communication system for the communication from motor vehicle to motor vehicle;

wirelessly communicating by the second motor vehicle by its respective communication system for the communication from motor vehicle to motor vehicle to a communication system for the communication from motor vehicle to motor vehicle of at least one third motor vehicle, the orientation with respect to the reference direction of the first motor vehicle and of the second motor vehicle;

determining in the third motor vehicle an orientation of the third motor vehicle with respect to the reference direction;

determining in the third motor vehicle with the use of the orientation with respect to the reference direction of the first to the third vehicle a relative orientation of the third motor vehicle with respect to the first motor vehicle and the second motor vehicle;

evaluating in the third motor vehicle the relative orientation of the first motor vehicle with respect to the third one and of the second motor vehicle with respect to the third one based on a result of the evaluation; and deciding whether the third motor vehicle becomes a participant in the ad-hoc radio network by the communication system for the communication from motor vehicle to motor vehicle.

9. The method according to claim 8, further comprising:

the third motor vehicle wirelessly communicates by the communication system for the communication from motor vehicle to motor vehicle to a communication system for the communication from motor vehicle to motor vehicle of at least one fourth motor vehicle, the orientation with respect to the reference direction of the first and the third motor vehicle, and wherein, in the fourth motor vehicle, an orientation of the fourth motor vehicle with respect to the reference direction is determined;

in the fourth motor vehicle with the use of the orientation with respect to the reference direction of the first, third and fourth vehicle, a relative orientation of the fourth motor vehicle with respect to the first motor vehicle and the third one is determined;

in the fourth motor vehicle, an evaluation of the relative orientation of the first motor vehicle to the fourth one and of the third motor vehicle with respect to the fourth motor vehicle is carried out and based on a result of the evaluation; and deciding whether the fourth motor vehicle becomes a participant in the ad-hoc radio network by the communication system for the communication from motor vehicle to motor vehicle.

10. The method according to claim 8, wherein the orientation with respect to the reference direction of at least one of the motor vehicles is determined by an electronic compass.

11. The method according to claim 10, wherein the reference direction is a compass point.

12. The method according to claim 11, wherein the compass point is North.

* * * * *